US012629994B2

(12) United States Patent

Nakano

(10) Patent No.: US 12,629,994 B2

(45) Date of Patent: May 19, 2026

(54) VEHICLE DOOR

(71) Applicant: SUBARU CORPORATION, Tokyo (JP)

(72) Inventor: Kunihiko Nakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 381 days.

(21) Appl. No.: 18/375,747

(22) Filed: Oct. 2, 2023

(65) Prior Publication Data

US 2024/0131906 A1 Apr. 25, 2024
US 2024/0227517 A9 Jul. 11, 2024

(30) Foreign Application Priority Data

Oct. 19, 2022 (JP) ................................. 2022-167995

(51) Int. Cl.
*B60J 5/04* (2006.01)

(52) U.S. Cl.
CPC ........... *B60J 5/0433* (2013.01); *B60J 5/0416* (2013.01)

(58) Field of Classification Search
CPC .............................. B60J 5/0433; B60J 5/0456
See application file for complete search history.

(56) References Cited

U.S. PATENT DOCUMENTS

| | | | | | |
|---|---|---|---|---|---|
| 6,065,797 | A | * | 5/2000 | Shirasaka | E05B 77/12 |
| | | | | | 296/146.1 |
| 7,648,192 | B2 | * | 1/2010 | Herline | E05B 77/04 |
| | | | | | 296/146.1 |
| 8,079,631 | B2 | * | 12/2011 | Higgins | E05B 77/04 |
| | | | | | 296/146.1 |
| 8,414,038 | B2 | * | 4/2013 | Bedekar | E05B 77/04 |
| | | | | | 292/216 |
| 8,955,257 | B2 | * | 2/2015 | Moriya | B60J 5/042 |
| | | | | | 49/502 |
| 9,592,721 | B1 | * | 3/2017 | Kelly | B60J 5/0437 |
| 10,549,610 | B2 | * | 2/2020 | Tanaka | B60J 5/0437 |
| 11,608,659 | B2 | * | 3/2023 | Kovie | E05B 77/04 |
| 12,172,501 | B2 | * | 12/2024 | Snyder | E05B 79/20 |
| 2019/0136583 | A1 | * | 5/2019 | Gray | E05B 83/40 |

FOREIGN PATENT DOCUMENTS

JP 5909220 B 4/2016

* cited by examiner

*Primary Examiner* — Aaron L Lembo

(74) *Attorney, Agent, or Firm* — McGinn IP Law Group, PLLC

(57) ABSTRACT

A vehicle door includes a beam, an inner panel, a lever lock bracket, and a beam bracket. The beam extends inside the vehicle door in a front-rear direction of a vehicle. The inner panel includes an inner plate. The lever lock bracket is configured to restrict an operation of the door latch mechanism when contact from a side of the vehicle occurs. The beam bracket includes a front vertical wall surface and a rear vertical wall surface. The lever lock bracket is disposed on a vehicle front side of the beam bracket. The rear vertical wall surface of the beam bracket is provided toward an outer side in a vehicle width direction of the vehicle. The front vertical wall surface of the beam bracket includes an inclined surface inclined on the vehicle front side toward the outer side in the vehicle width direction.

19 Claims, 6 Drawing Sheets

VEHICLE DOOR

CROSS-REFERENCE TO RELATED APPLICATIONS

The present application claims priority from Japanese Patent Application No. 2022-167995 filed on Oct. 19, 2022, the entire contents of which are hereby incorporated by reference.

BACKGROUND

The disclosure relates to a vehicle door.

A vehicle body structure has been demanded in recent years that reduces an amount of deformation of a vehicle door, to be mounted on a vehicle, toward a vehicle compartment of the vehicle even when contact is applied from a side surface of the vehicle.

In general, the vehicle door to be mounted on the vehicle such as an automobile includes plate-shaped steel panels. The vehicle door includes an outer panel disposed on an outer side in a vehicle width direction of the vehicle door, and an inner panel disposed on an inner side in the vehicle width direction. The outer panel and the inner panel are combined with each other and are joined by a method such as welding.

To improve a rigidity against the contact from the side surface (hereinafter, referred to as side contact), the vehicle door has a structure in which a beam is extended in a vehicle front-rear direction in a space, e.g., the inside of the vehicle door, between the outer panel and the inner panel to thereby absorb an impact caused by the side contact. When the side contact occurs, the structure in which the beam is disposed inside the vehicle door is adapted to allow the outer panel and the beam to deform while absorbing a contact energy, and the outer panel and the beam to further abut against the inner panel to absorb the contact energy.

What is notable is that the vehicle door of this type is so configured that an engagement between the vehicle door and a vehicle body is not released when the side contact occurs.

For example, Japanese Patent No. 5909220 discloses a technique in which a restricting member restricts a displacement of a rod that releases the engagement between a vehicle door body and the vehicle body, when the side contact occurs and an impact load is applied from the outside of a vehicle. Thus, the technique prevents the engagement between the vehicle door and the vehicle body from being released and the vehicle door from being opened.

SUMMARY

An aspect of the disclosure provides a vehicle door to be applied to a vehicle that includes a body. The vehicle door is configured to be closed by an engagement of a door latch mechanism with a striker provided on the body. The vehicle door includes a beam, an inner panel, a lever lock bracket, and a beam bracket. The beam extends inside the vehicle door in a front-rear direction of the vehicle. The inner panel includes an inner plate of the vehicle door. The lever lock bracket is coupled to the beam, and configured to restrict an operation of the door latch mechanism when contact from a side of the vehicle occurs. The beam bracket includes a front vertical wall surface and a rear vertical wall surface respectively on both sides in the front-rear direction of the vehicle, and fixes the beam to the inner panel. The front vertical wall surface and the rear vertical wall surface are provided in an up-down direction of the vehicle. The rear vertical wall surface is coupled to an end on a vehicle rear side of the beam. The lever lock bracket is disposed on a vehicle front side of the beam bracket. The rear vertical wall surface of the beam bracket is provided toward an outer side in a vehicle width direction. The front vertical wall surface of the beam bracket includes an inclined surface inclined on the vehicle front side toward the outer side in the vehicle width direction.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
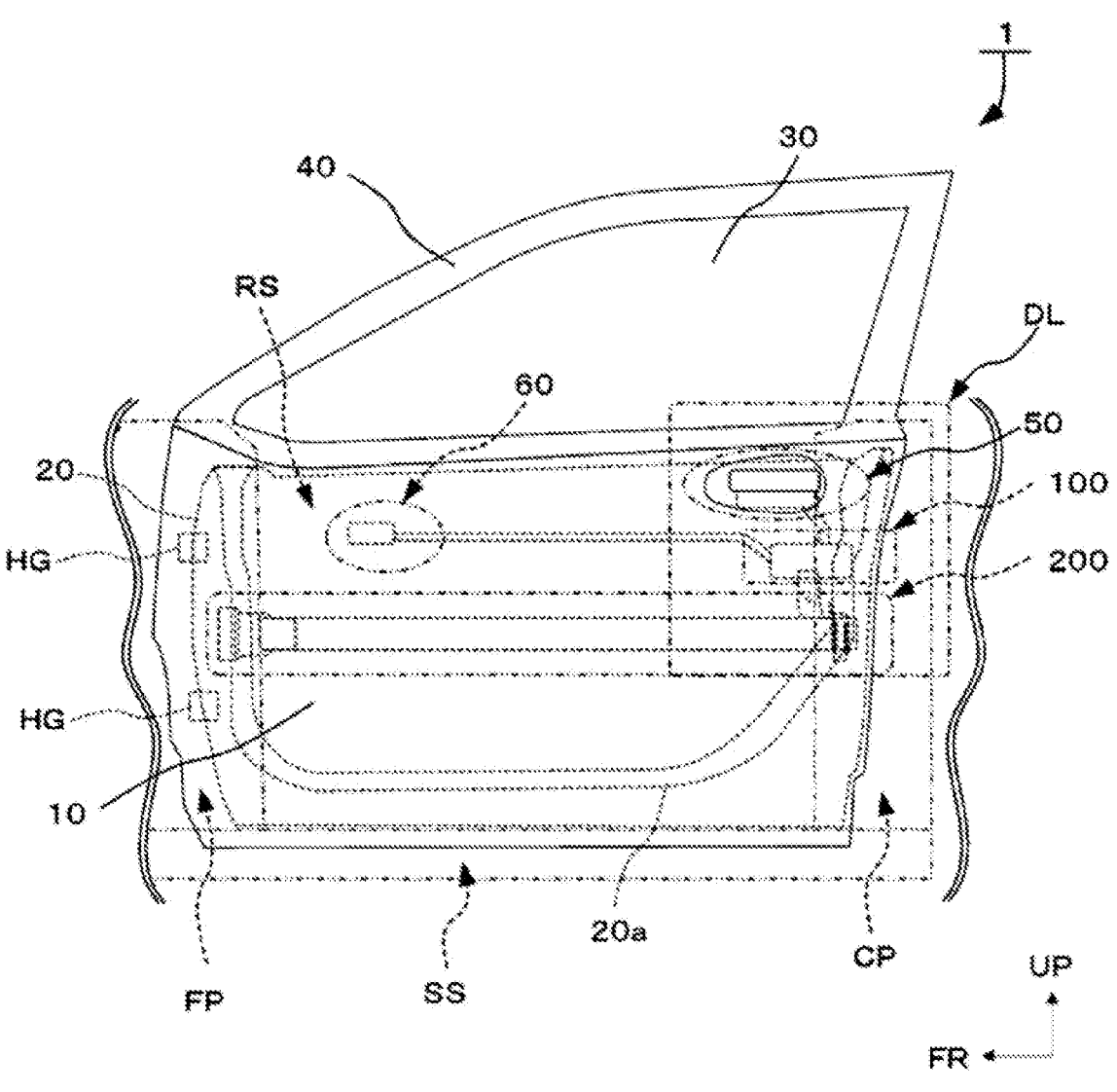
FIG. 1 is a schematic configuration diagram of a vehicle door according to one example embodiment of the disclosure as viewed from an outer side in a vehicle width direction.

The technique disclosed in Japanese Patent No. 5909220 couples a regulating member to a beam at a connection part, which can cause a deformation of a stiffener, or the beam, and a displacement of a relative position between the regulating member and a rod, when side contact occurs and an impact load is applied from an outer side of a vehicle. In addition, securing the relative position between the regulating member and the beam can result in an increase in size of the regulating member and a complication of the connection part at which the regulating member and the beam are coupled to each other and a shape of the rod as well.

It is desirable to provide a vehicle door that makes it possible to maintain a rigidity of the vehicle door while preventing opening of the vehicle door when contact from a side surface of a vehicle occurs.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Hereinafter, a vehicle to which a vehicle door 1 according to an example embodiment is to be applied will be described with reference to FIGS. 1 to 6. It should be noted that an arrow FR illustrated in any drawing indicates a front side of the vehicle illustrated in FIG. 1, an arrow UP indicates an upper side in the front view, and an arrow LH indicates a left side in the front view. In the following, an up-down direction, a front-rear direction, and a left-right direction respectively denote an up-down direction in the front view, a front-rear direction in the front view, and a left-right direction in the front view, when the description is made using the up-down direction, the front-rear direction, and the left-right direction unless otherwise specified.

Example Embodiment

Figure 2:
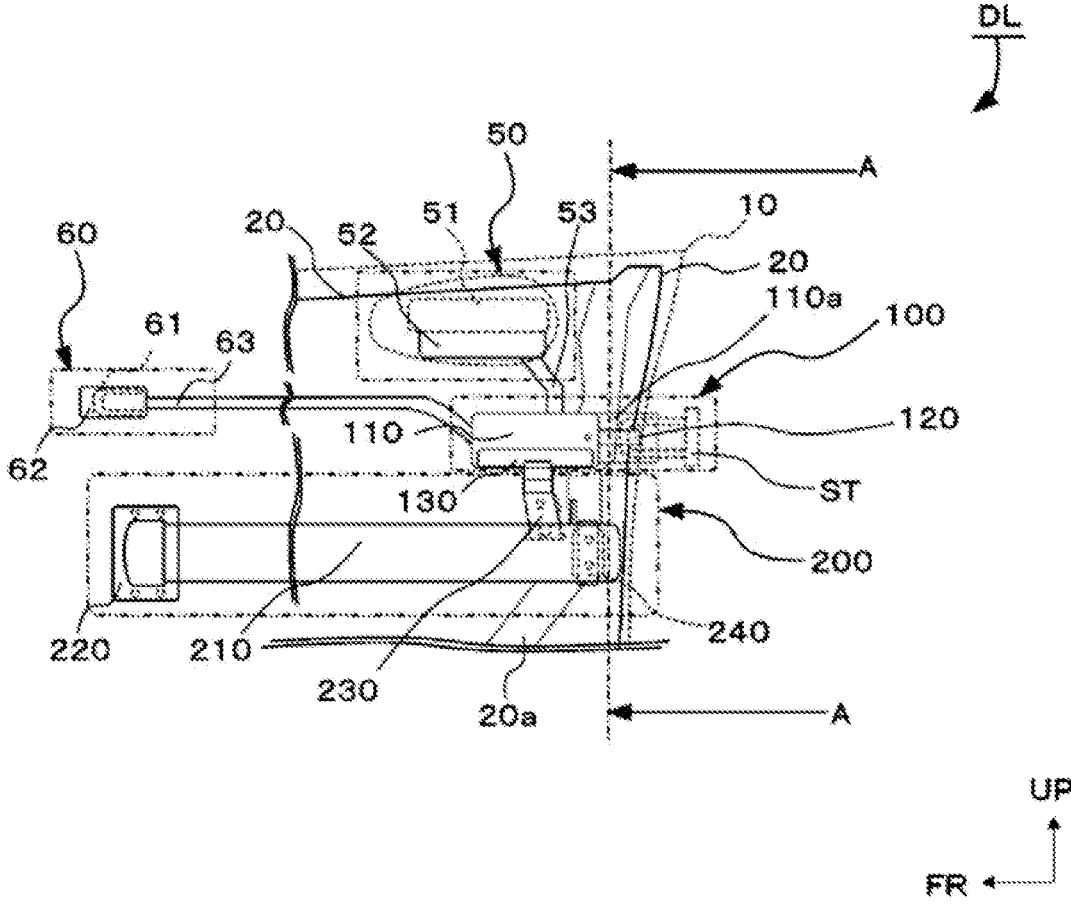
FIG. 2 is a schematic configuration diagram in which a DL region illustrated in FIG. 1 is enlarged and viewed through an outer panel from the outer side in the vehicle width direction.

A configuration of the vehicle door 1 will be described with reference to FIGS. 1 to 4. It should be noted that the vehicle door 1 to be mounted on a right side in the front view of the vehicle will be described as an example.
[Configuration of Vehicle Door 1]
Referring to FIG. 1, the vehicle door 1 may include an outer panel 10, an inner panel 20, a door window 30, a door sash 40, an outer handle 50, an inner handle 60, a door latch mechanism 100, and a door beam 200. The vehicle door 1 may include, on an inner side in a vehicle width direction, a frame that forms a strong skeleton of the vehicle. A front pillar FP may be provided at a vehicle front part of the vehicle door 1, a center pillar CP may be provided at a vehicle rear part of the vehicle door 1, and a side sill SS may be provided at a vehicle lower part of the vehicle door 1. The vehicle door 1 may be fixed to the front pillar FP by a hinge HG.
[Outer Panel 10]
The outer panel 10 may be a plate-shaped member configuring an outer plate of the vehicle door 1, and may be disposed on an outer side in the vehicle width direction. The outer panel 10 may be a pressed material such as a pressed metal plate.
[Inner Panel 20]
The inner panel 20 may be a plate-shaped member configuring an inner plate of the vehicle door 1, and may be disposed on an inner side of the outer panel 10 in the vehicle width direction. The inner panel 20 may be a pressed material such as a pressed metal plate. The inner panel 20 may include a rib 20a to ensure a rigidity.
The outer panel 10 and the inner panel 20 may be combined with each other, and may be joined to each other by a method such as welding at respective ends in the front-rear and up-down directions of the vehicle. The vehicle door 1 may have an inner space RS surrounded by the outer panel 10 and the inner panel 20. Later-described members including the door latch mechanism 100 and the door beam 200 may be provided in the inner space RS serving as an interior of the vehicle door 1.
[Door Window 30]
The door window 30 may be plate-shaped tempered glass so mounted in the vehicle door 1 as to be movable up and down. The door window 30 may close the later-described door sash 40 when the door window 30 is raised. The door window 30 may have a substantially trapezoidal shape in which a front end edge and a rear end edge of the door window 30 are formed in accordance with an inclination of the door sash 40 in a side view of the vehicle.
[Door Sash 40]
The door sash 40 may be so provided at a vehicle upper part of the vehicle door 1 as to surround the door window 30. The door sash 40 may be joined to the outer panel 10 and the inner panel 20 by a method such as welding at the vehicle front part and the vehicle rear part of the vehicle door 1.
[Outer Handle 50 and Inner Handle 60]
As illustrated in FIG. 2, the outer handle 50 may include a grip 51, a rod mechanism 52, and a rod 53. The grip 51 may be operated by a user when the user opens the vehicle door 1 from the outside of a vehicle compartment of the vehicle.
The grip 51 may be formed in a substantially rectangular shape in which the vehicle front-rear direction is a longitudinal direction. The grip 51 may be a member that includes a material such as resin or metal. The grip 51 may have a rotation shaft in the vehicle front-rear direction on an upper side of the vehicle, for example. The grip 51 may be coupled to the rod mechanism 52 by an unillustrated arm. The rod mechanism 52 may be disposed on an inner side in the vehicle width direction of the grip 51.
The rod mechanism 52 may include an unillustrated mechanism part that transmits the operation of the grip 51 to the door latch mechanism 100 via the rod 53. The rod 53 may have a first end coupled to the rod mechanism 52, and a second end coupled to the later-described door latch mechanism 100.
The inner handle 60 may include a grip 61, a rod mechanism 62, and a rod 63. The grip 61 may be operated by the user when the user opens the vehicle door 1 from the inside of the vehicle compartment.
The grip 61 may be formed in a substantially rectangular shape in which the vehicle front-rear direction is a longitudinal direction. The grip 61 may be a member that includes a material such as resin or metal. The grip 61 may be coupled to the rod mechanism 62 by an unillustrated arm. The rod mechanism 62 may be disposed on an outer side in the vehicle width direction of the grip 61.
The rod mechanism 62 may include an unillustrated mechanism part that transmits the operation of the grip 61 to the door latch mechanism 100 via the rod 63. The rod 63 may have a first end coupled to the rod mechanism 62, and a second end coupled to the door latch mechanism 100.
[Door Latch Mechanism 100]
The door latch mechanism 100 may include a latch mechanism 110, a latch arm 120, and a latch lever 130. The door latch mechanism 100 may be accommodated in the vehicle door 1 and may be fixed on an outer side in the vehicle width direction of the inner panel 20.
The latch mechanism 110 may be accommodated in the vehicle door 1 and may be fixed on an outer side in the vehicle width direction of the inner panel 20. The latch mechanism 110 may be accommodated in a cover. The cover may be a member that includes a material such as a resin or metal. The latch mechanism 110 may be coupled to the second end of the rod 53 of the outer handle 50 and the second end of the rod 63 of the inner handle 60. The latch mechanism 110 may include an unillustrated release mechanism and an unillustrated interlocking mechanism. The release mechanism may operate the latch arm 120 by an operation of the outer handle 50 and the inner handle 60. The interlocking mechanism may interlock an operation of the latch arm 120 with an operation of the latch lever 130. An engaging part 110a protruding toward the rear side of the vehicle may be provided on a vertical wall surface provided on the rear side of the vehicle.

The latch arm 120 may engage with a striker ST to lock the vehicle door 1 when the vehicle door 1 is closed. The striker ST may be provided at a body of the vehicle. The latch arm 120 may be a rod-shaped member that includes metal and having a high rigidity. The latch arm 120 may be so provided as to protrude from a vertical wall surface on the vehicle rear side of the latch mechanism 110. For example, the latch arm 120 may include a distal end bent inward in the vehicle width direction and accommodated in the engaging part 110a.

The latch lever 130 may be a member that includes a material such as a resin or metal. For example, the latch lever 130 may have a substantially rectangular shape extending in the vehicle front-rear direction. The latch lever 130 may be so disposed on an outer side of a vehicle lower part of the door latch mechanism 100 as to protrude from an outer surface of the door latch mechanism 100. The latch arm 120 and the latch lever 130 may be so coupled to each other as to be interlockable inside the latch mechanism 110. The latch lever 130 may be accommodated in the door latch mechanism 100, when the latch arm 120 engages with the striker ST and the vehicle door 1 is locked. The latch lever 130 may protrude toward a vehicle lower side of the door latch mechanism 100, when the latch arm 120 releases the striker ST and the vehicle door 1 is unlocked.

[Door Beam 200]

The door beam 200 may include a beam 210, a fixing bracket 220, a lever lock bracket 230, and a beam bracket 240.

[Beam 210]

The beam 210 may be a pipe-shaped member that includes a material such as metal and having a high rigidity. The beam 210 may have a circular cross section. The beam 210 may extend in the vehicle front-rear direction from the front of the vehicle to the rear of the vehicle at a middle part in the vehicle up-down direction of the vehicle door 1. The beam 210 may be fixed to the inner panel 20 via the fixing bracket 220 and a beam bracket 240. The fixing bracket 220 may be coupled to a front end of the vehicle. The beam bracket 240 may be coupled to a rear end of the vehicle.

[Fixing Bracket 220]

The fixing bracket 220 may be a fixing metal fitting formed by a method such as press working of a plate material such as a metal plate. The fixing bracket 220 may be coupled to a side end of a vehicle front part of the beam 210 by a method such as welding. The fixing bracket 220 may be fixed on a vehicle front side of the inner panel 20 by a member such as a bolt. The inner panel 20 to which the fixing bracket 220 is fixed may have a member such as a rib that increases the rigidity of the inner panel 20. The front pillar FP having a high rigidity and forming the skeleton of the vehicle may be provided in a region on an inner side in the vehicle width direction of the fixing bracket 220.

[Lever Lock Bracket 230]

The lever lock bracket 230 may be a fixing metal fitting formed by a method such as press working of a plate material such as a metal plate. The lever lock bracket 230 may have a substantially rectangular plate shape extending in the vehicle up-down direction. The lever lock bracket 230 may be joined to the beam 210 by a method such as welding on the vehicle front side of the later-described beam bracket 240.

Figure 3:
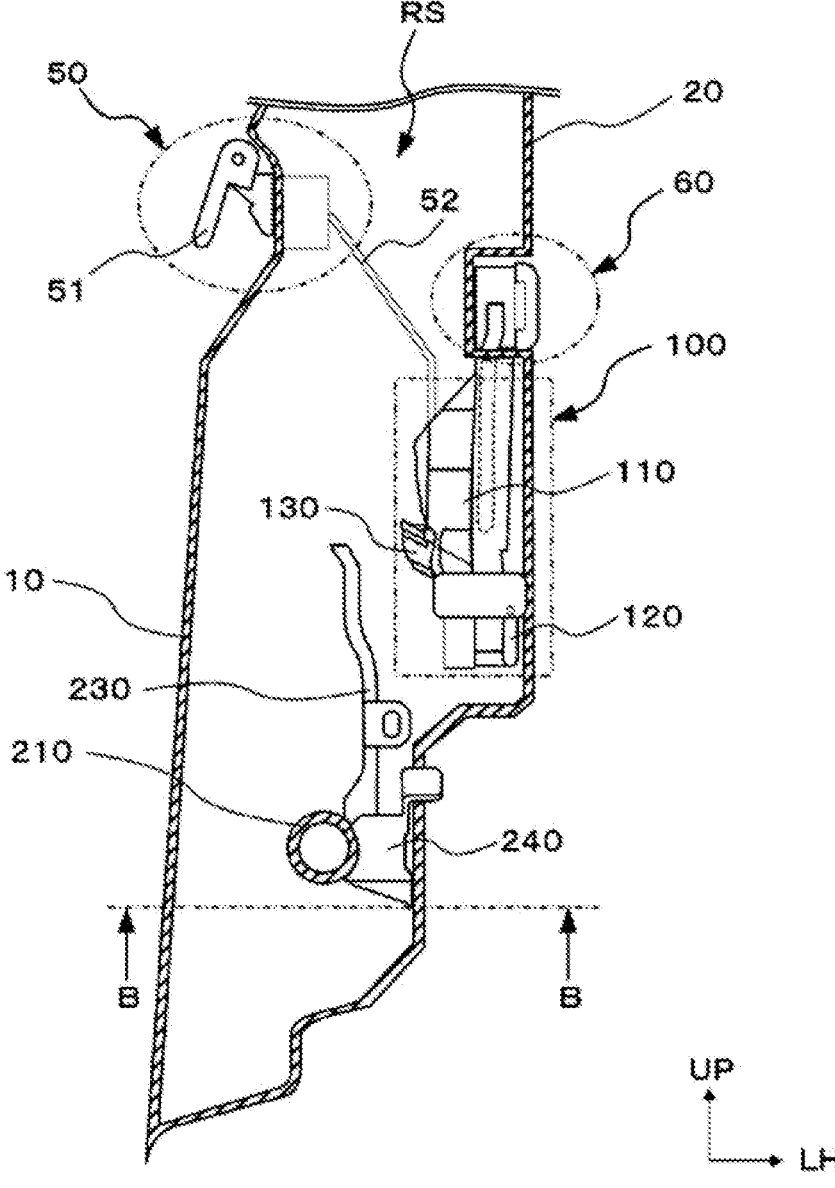
FIG. 3 is a cross-sectional view taken along line A-A illustrated in FIG. 2 and as viewed in a direction denoted by A.

Referring to FIG. 3, the lever lock bracket 230 may be bent, at a vehicle upper side of the lever lock bracket 230, toward an outer side of the upper part of the vehicle, and may be further bent, at the vehicle upper side of the lever lock bracket 230, toward the upper part of the vehicle. The lever lock bracket 230 may project, at both sides in the vehicle front-rear direction on a vehicle lower side of the lever lock bracket 230, in a substantially rectangular shape toward a lower side of the vehicle. The lever lock bracket 230 may be joined, at a protruding end on the vehicle lower side of the lever lock bracket 230, to the beam 210 by a method such as welding. The lever lock bracket 230 may be disposed on the vehicle lower side of the door latch mechanism 100. A vehicle upper end of the lever lock bracket 230 may be disposed adjacent to a region on an outer side of the vehicle lower part of the latch lever 130 of the door latch mechanism 100.

[Beam Bracket 240]

The beam bracket 240 may be a fixing metal fitting formed by a method such as press working of a plate material such as a metal plate. The beam bracket 240 may have a substantially rectangular plate shape extending in the vehicle up-down direction. The beam bracket 240 may be joined, at an end of a vehicle rear part of the beam 210, to the beam 210 by a method such as welding. The beam bracket 240 may be fixed, on an inner side in the vehicle width direction, to the inner panel 20 by a member such as a bolt. The inner panel 20 to which the beam bracket 240 is fixed may have a member such as a rib that increases the rigidity.

Figure 4:
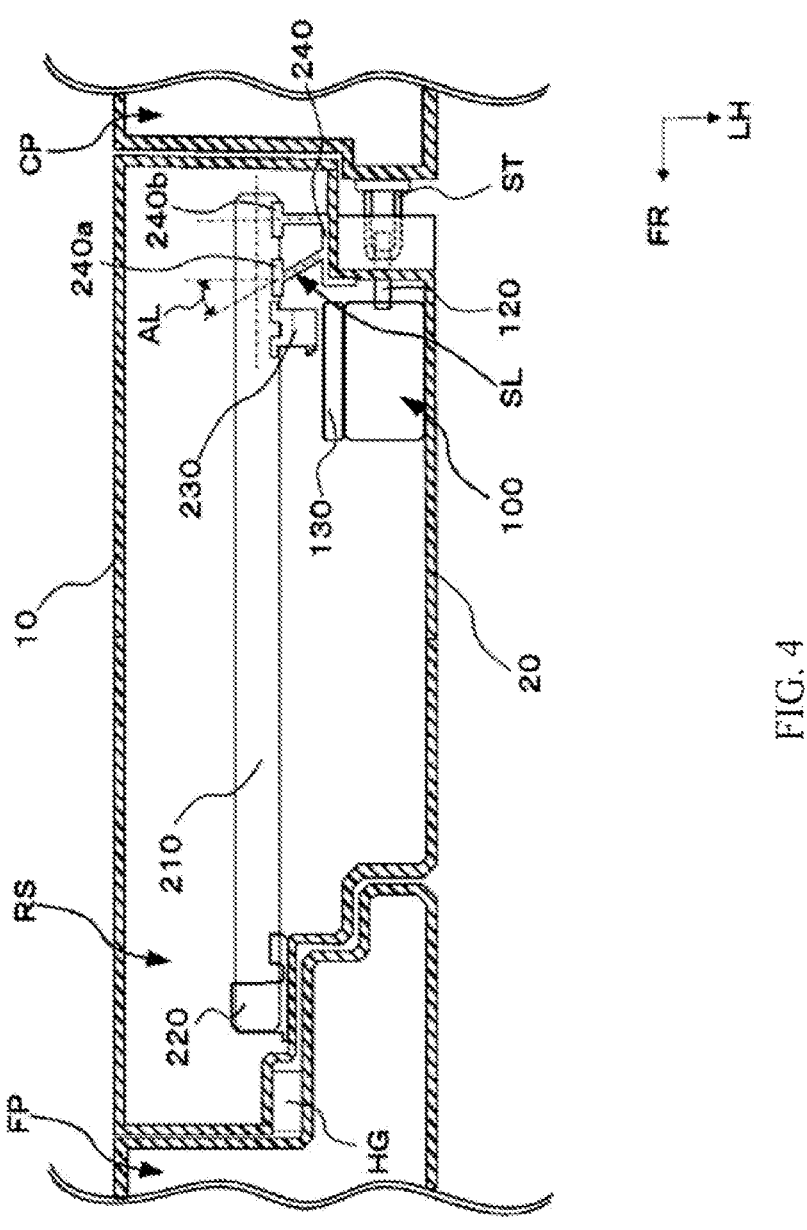
FIG. 4 is a cross-sectional view taken along line B-B illustrated in FIG. 3 and as viewed in a direction denoted by B.

Referring to FIG. 4, a vertical wall 240a and a vertical wall 240b that are substantially rectangular and protrude toward an outer side in the vehicle width direction are provided at both ends in the vehicle front-rear direction at a middle part in the vehicle up-down direction of the beam bracket 240. The vertical wall 240a on a vehicle front side may be inclined toward the vehicle front side with respect to a vertical axis oriented in the vehicle width direction orthogonal to an axial direction of the beam 210. The vertical wall 240a includes an inclined surface SL. The inclined surface SL may be provided, for example, at an angle AL of 30 degrees to 60 degrees with respect to the vertical axis oriented in the vehicle width direction orthogonal to the axial direction of the beam 210. The vertical wall 240b on a vehicle rear side may be provided toward an outer side in the vehicle width direction, and may be provided at a substantially right angle with respect to the axial direction of the beam 210. For example, the vertical wall 240b may be provided in the vehicle width direction. The beam bracket 240 may be joined to the beam 210 by a method such as welding at a vehicle lower end of the vertical wall 240a and the vertical wall 240b.

Workings and Example Effects

Hereinafter, an operation where contact from a side of the vehicle (hereinafter, referred to as side contact) is occurred will be described with reference to FIGS. 5 and 6.

Figure 5:
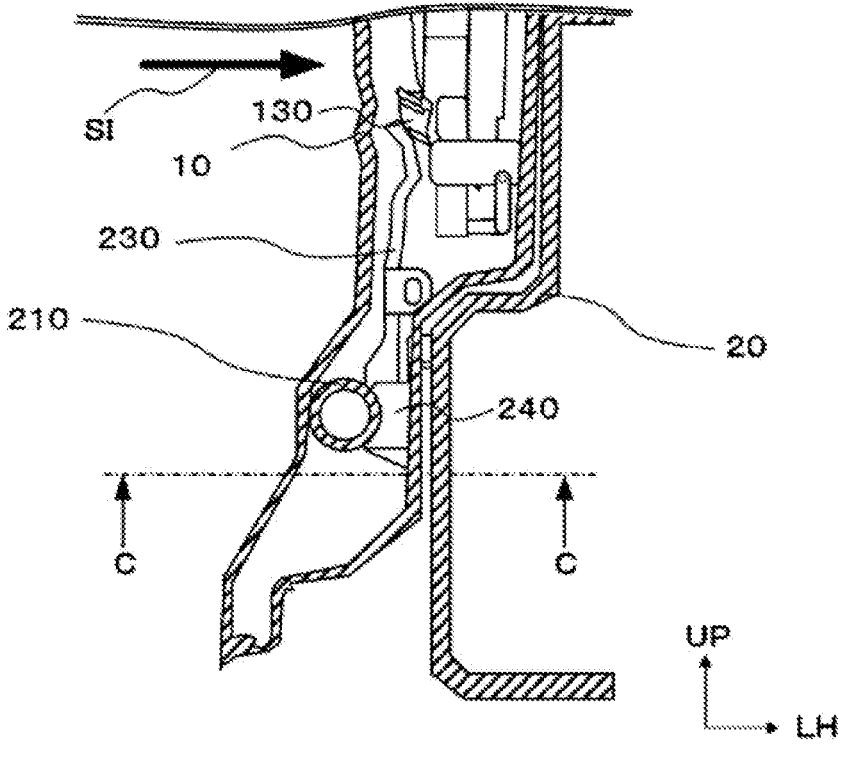
FIG. 5 is a cross-sectional view taken along line A-A illustrated in FIG. 2 and as viewed in the direction denoted by A when contact from a side occurs.
Figure 6:
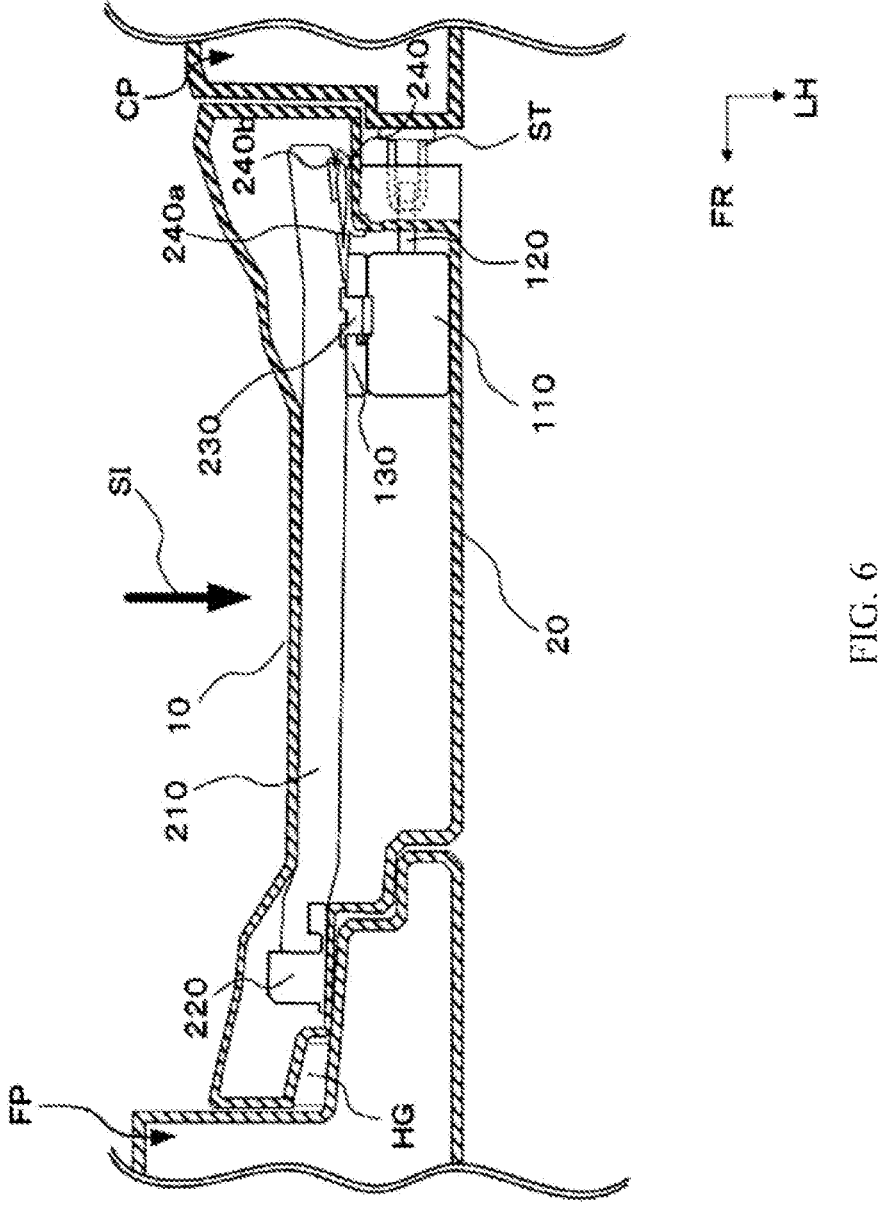
FIG. 6 is a cross-sectional view taken along line C-C illustrated in FIG. 5 and as viewed from a direction denoted by C when the contact from the side occurs.

Referring to FIG. 5, a contact energy is transmitted in a direction denoted by an arrow SI when the side contact of the vehicle occurs where the vehicle door 1 is closed. The contact energy deforms the outer panel 10 is transmitted to the beam 210. The contact energy transmitted to the beam 210 is transmitted to the fixing bracket 220 and the beam bracket 240 coupled to the end in the vehicle front-rear direction of the beam 210.

The contact energy transmitted to the fixing bracket 220 pushes the inner panel 20 toward an inner side in the vehicle width direction while deforming the inner panel 20. The contact energy causes the inner panel 20 to abut against the front pillar FP, and is transmitted to the front pillar FP via the inner panel 20 and is thus dispersed accordingly.

The contact energy transmitted to the beam bracket 240 pushes the vertical wall 240a and the vertical wall 240b coupled to the beam 210 toward the inner side in the vehicle width direction. The vertical wall 240a on the vehicle front side of the beam bracket 240 has the inclined surface SL. Thus, the vertical wall 240a falls toward the inner side of the front part of the vehicle with one side on the side on which the vertical wall 240a is fixed to the inner panel 20 serving as a fulcrum. The vertical wall 240b on the vehicle rear side of the beam bracket 240 is deformed toward the inner side in the vehicle width direction, and falls toward the inner side of the front part of the vehicle with one side on the side on which the vertical wall 240b is fixed to the inner panel 20 serving as a fulcrum.

The falling of the beam bracket 240 allows the contact energy to be transmitted to the inner panel 20 via the beam bracket 240, and pushes the inner panel 20 toward the inner side in the vehicle width direction while deforming the inner panel 20. The contact energy causes the inner panel 20 to abut against the center pillar CP and the side sill SS, and is transmitted to the center pillar CP and the side sill SS via the inner panel 20 and is dispersed accordingly.

Accordingly, when the side contact occurs, the contact energy transmitted to the beam 210 is transmitted to the front pillar FP, the center pillar CP, and the side sill SS configuring the skeleton of the vehicle via the fixing bracket 220 and the deformed beam bracket 240 to be dispersed, and is thus absorbed.

When the vehicle door 1 is closed, the latch arm 120 of the door latch mechanism 100 engages with the striker ST provided on the body of the vehicle, and the vehicle door 1 thus locked. At this time, the latch lever 130 of the door latch mechanism 100 interlocks with the latch arm 120 and is accommodated in the door latch mechanism 100. When the latch lever 130 is accommodated in the door latch mechanism 100, the latch arm 120 maintains a state in which the latch arm 120 is engaged with the striker ST, preventing the door latch mechanism 100 from shifting to a state in which the latch lever 130 is released from the striker ST.

When the side contact occurs with the vehicle door 1 being closed, the lever lock bracket 230 coupled to a region on the vehicle front side of the beam bracket 240 is pushed toward the inner side of the front part of the vehicle as a result of the beam 210 being pushed toward the inner side in the vehicle width direction. When the beam bracket 240 falls toward the inner side of the front part of the vehicle, the lever lock bracket 230 falls toward the inner side of the front part of the vehicle. Further, a vehicle upper end of the lever lock bracket 230 enters a vehicle lower side of the door latch mechanism 100 disposed on an inner side of a vehicle front part of the lever lock bracket 230. Referring to FIG. 6, a position at which the lever lock bracket 230 enters the vehicle lower side of the door latch mechanism 100 is determined by a shape of the beam bracket 240. The vertical wall 240a on the vehicle front side of the beam bracket 240 has the inclined surface SL. Thus, the vertical wall 240a falls toward the inner side of the front part of the vehicle with one side on the side on which the vertical wall 240a is fixed to the inner panel 20 serving as a fulcrum. Accordingly, the lever lock bracket 230 securely enters the vehicle lower side of the door latch mechanism 100. The lever lock bracket 230 restricts the latch lever 130 to a state in which the latch lever 130 is accommodated in the door latch mechanism 100 by being adjacent to or in close contact with the vehicle lower part of the latch lever 130. The latch arm 120 remains engaged with the striker ST and thereby locks the vehicle door 1 in the closed state.

The vehicle door 1 according to the foregoing example embodiment is to be applied to the vehicle that includes the body and configured to be closed by an engagement of the door latch mechanism 100 with the striker ST provided on the body. The vehicle door 1 includes: the beam 210 extending in the inner space RS of the vehicle door 1 in the front-rear direction of the vehicle; the inner panel 20 including the inner plate of the vehicle door 1; the lever lock bracket 230 coupled to the beam 210, and configured to restrict the operation of the door latch mechanism 100 when contact from a side of the vehicle occurs; and the beam bracket 240 that includes, on both sides in the front-rear direction of the vehicle, the vertical wall 240a and the vertical wall 240b serving as the vertical wall surfaces and fixes the beam 210 to the inner panel 20, in which the vertical wall 240a and the vertical wall 240b are provided in the up-down direction of the vehicle and are coupled to respective ends on a vehicle rear side of the beam 210. The lever lock bracket 230 is disposed on the vehicle front side of the beam bracket 240. The vertical wall 240b positioned on the vehicle rear side of the beam bracket 240 is provided toward the outer side in the vehicle width direction. The vertical wall 240a positioned on the vehicle front side of the beam bracket 240 includes the inclined surface SL inclined on the vehicle front side toward the outer side in the vehicle width direction.

When the side contact occurs, the contact energy is transmitted to the beam 210, and the beam 210 is pushed toward the inner side in the vehicle width direction. The beam bracket 240 is pushed toward the inner side in the vehicle width direction by the contact energy transmitted from the beam 210. The vertical wall 240a on the vehicle front side of the beam bracket 240 has the inclined surface SL. Thus, the vertical wall 240a falls toward the inner side of the front part of the vehicle with one side on the side on which the vertical wall 240a is fixed to the inner panel 20 serving as a fulcrum. The beam 210 falls toward the inner side of the front part of the vehicle. The movement of the beam 210 allows the lever lock bracket 230 coupled to the beam 210 on the vehicle front side of the beam bracket 240 to securely enter the vehicle lower side of the door latch mechanism 100 disposed on the inner side of the vehicle front part of the lever lock bracket 230.

The front pillar FP and the center pillar CP may be provided on the inner side in the vehicle width direction of the fixing bracket 220 and the beam bracket 240, and both ends of the beam 210 abut against the front pillar FP and the center pillar CP having the high rigidity by the deformation of the beam bracket 240.

For example, when the side contact occurs, the beam bracket 240 coupled to the end in the vehicle rear part of the beam 210 is deformed toward the inner side of the front part of the vehicle, which allows the lever lock bracket 230 to securely enter the vehicle lower side of the door latch mechanism 100. Thus, allowing the lever lock bracket 230 to enter the vehicle lower side of the latch lever 130 provided on the outer side of the vehicle lower part of the door latch mechanism 100 and restricting the operation of the latch lever 130 make it possible for the beam bracket 240 to restrict the latch lever 130 to the state accommodated in the door latch mechanism 100. Accordingly, this configuration helps to allow the vehicle door 1 to be securely kept in the locked state. In addition, the deformation of the beam bracket 240 allows both ends of the beam 210 to securely abut against the front pillar FP and the center pillar CP having the high rigidity. Accordingly, this configuration helps to allow the contact energy to be transmitted to the front pillar FP and the center pillar CP and dispersed.

According to at least one embodiment of the disclosure, it possible to maintain a rigidity of the vehicle door while preventing opening of the vehicle door when the side contact occurs.

In the foregoing example embodiment of the disclosure, the door latch mechanism 100 may be a manual door latch mechanism 100 in which the release operation is performed by the rod mechanism 52 of the outer handle 50 and the rod mechanism 62 of the inner handle 60. In some embodiments, the door latch mechanism 100 may be an electric door latch mechanism 100 in which a control circuit is mounted and the release operation is performed by driving a device such as an electric motor.

As used herein, the term "collision" may be used interchangeably with the term "contact".

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A vehicle door to be applied to a vehicle that includes a body, the vehicle door being configured to be closed by an engagement of a door latch mechanism with a striker provided on the body, the vehicle door comprising:

a beam extending inside the vehicle door in a front-rear direction of the vehicle;

an inner panel comprising an inner plate of the vehicle door;

a lever lock bracket coupled to the beam, the lever lock bracket being configured to restrict an operation of the door latch mechanism when contact from a side of the vehicle occurs; and a beam bracket comprising a front vertical wall surface and a rear vertical wall surface respectively on both sides in the front-rear direction of the vehicle, the beam bracket fixing the beam to the inner panel, the front vertical wall surface and the rear vertical wall surface being provided in an up-down direction of the vehicle, the rear vertical wall surface being coupled to an end on a vehicle rear side of the beam, wherein the lever lock bracket is disposed on a vehicle front side of the beam bracket, wherein the rear vertical wall surface of the beam bracket is provided toward an outer side in a vehicle width direction, wherein the front vertical wall surface of the beam bracket comprises an inclined surface inclined on the vehicle front side toward the outer side in the vehicle width direction, wherein the front vertical wall surface collapses toward a front inner side of the vehicle with an edge fixed to the inner panel serving as a fulcrum, wherein the rear vertical wall surface collapses toward the front inner side of the vehicle while deforming toward the vehicle-widthwise inner side, with an edge fixed to the inner panel portion serving as a fulcrum, and wherein the rear vertical wall surface is provided at a right angle with respect to an axial direction of the beam.

2. The vehicle door according to claim 1, wherein the inclined surface of the front vertical wall surface is inclined at an angle of 30 degrees to 60 degrees with respect to a vertical axis oriented in the vehicle width direction orthogonal to an axial direction of the beam.

3. The vehicle door according to claim 1, wherein the front vertical wall surface and the rear vertical wall surface protrude toward the outer side in the vehicle width direction at a middle part in the up-down direction of the beam bracket.

4. The vehicle door according to claim 1, wherein the beam bracket is joined to the beam at a vehicle lower end of the front vertical wall surface and the rear vertical wall surface by welding.

5. The vehicle door according to claim 1, wherein the lever lock bracket has a rectangular plate shape extending in the up-down direction of the vehicle.

6. The vehicle door according to claim 5, wherein the lever lock bracket is bent, at a vehicle upper side thereof, toward the outer side in the vehicle width direction, and further bent toward an upper part of the vehicle.

7. The vehicle door according to claim 5, wherein the lever lock bracket projects, at both sides in the front-rear direction on a vehicle lower side thereof, in the rectangular shape toward a lower side of the vehicle, and is joined at a protruding end on the vehicle lower side to the beam by welding.

8. The vehicle door according to claim 1, wherein the lever lock bracket is disposed on a vehicle lower side of the door latch mechanism, with a vehicle upper end of the lever lock bracket disposed adjacent to a region on an outer side of a vehicle lower part of a latch lever of the door latch mechanism.

9. The vehicle door according to claim 1, wherein, during the contact from the side of the vehicle, the lever lock bracket enters the vehicle lower side of the door latch mechanism and is adjacent to or in close contact with a vehicle lower part of a latch lever of the door latch mechanism to restrict the latch lever to a state accommodated in the door latch mechanism.

10. The vehicle door according to claim 1, further comprising a fixing bracket coupled to a vehicle front end of the beam and fixed to a vehicle front side of the inner panel.

11. The vehicle door according to claim 10, wherein the fixing bracket is a metal fitting formed by press working of a metal plate and is coupled to the beam by welding and fixed to the inner panel by a bolt.

12. The vehicle door according to claim 10, wherein, during the contact from the side of the vehicle, contact energy transmitted to the beam is transmitted to a front pillar via the fixing bracket and the inner panel.

13. The vehicle door according to claim 1, wherein, during the contact from the side of the vehicle, contact energy transmitted to the beam is transmitted to a center pillar and a side sill via the beam bracket and the inner panel.

14. The vehicle door according to claim 1, wherein the inner panel includes a rib to increase rigidity.

15. The vehicle door according to claim 1, wherein the beam is a pipe-shaped member having a circular cross-section and is formed of metal with high rigidity.

16. The vehicle door according to claim 1, wherein the beam bracket is formed by press working of a metal plate and is fixed to the inner panel by a bolt.

17. The vehicle door according to claim 1, wherein, during the contact from the side of the vehicle, the inner panel deforms and abuts against a front pillar and a center pillar to disperse contact energy.

18. The vehicle door according to claim 1, wherein the beam extends in a middle part in the up-down direction of the vehicle door.

19. The vehicle door according to claim 1, wherein the door latch mechanism includes a latch arm that engages with the striker and a latch lever that interlocks with the latch arm, and wherein the lever lock bracket restricts movement of the latch lever during the contact from the side of the vehicle to maintain engagement of the latch arm with the striker.

\* \* \* \* \*